3,232,956
N-SUBSTITUTED-5-NITRO-2-FURAMIDINES
Louis Edmond Benjamin, Norwich, N.Y., assignor to The Norwich Pharmacal Company, Norwich, N.Y., a corporation of New York
No Drawing. Filed Sept. 30, 1963, Ser. No. 312,279
6 Claims. (Cl. 260—347.3)

This invention relates to novel nitrofuran compounds. In particular it is concerned with new N-substituted 5-nitro-2-furamidines which may be represented by the formula:

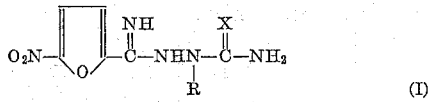

wherein

R represents a member of the group consisting of hydrogen, methyl and 2-hydroxyethyl; and X represents a member of the group consisting of oxygen and imino.

These new compounds are active parasiticides. In very small amounts they are capable of inhibiting the growth of pathogenic organisms such as *"Streptococcus agalactiae, Streptococcus pyogenes, Erysipelothrix insidiosa, Salmonella typhosa* and *Ecsherichia coli.* They are thus adapted to be combined with various carriers in the form of dusts, solutions, ointments and the like to form disinfectant compositions.

While these new compounds are useful as the active ingredient of disinfectant compositions, they are particularly valuable as intermediates in the preparation of other nitrofuran compounds. Such use is revealed in my copending application Serial No. 294,240, filed July 11, 1963, relating to 3-(5-nitro-2-furyl-Δ²-1,2,4-triazolines, a series of highly antimicrobial substances which may be prepared by refluxing a solution of a compound of Formula I above, or a salt thereof, in a suitable solvent such as nitrobenzene. In this fashion N-ureido-5-nitro-2-furamidine is converted to 5-oxo-3-(5-nitro-2-furyl)-Δ²-1,2,4-triazoline; N-guanidino-5-nitro-2-furamidine dihydrochloride yields 5-imino-3-(5-nitro-2-furyl)-Δ²-1,2,4-triazoline; N-(1-methylureido)-5-nitro-2-furamidine hydrochloride produces 1-methyl-5-oxo-3-(5-nitro-2-furyl)-Δ²-1,2,4-triazoline; N - [1 - (2 - hydroxyethyl)ureido]-5-nitro-2-furamidine hydrochloride yields 1-(2-hydroxyethyl)-5-oxo-3-(5-nitro-2-furyl)-Δ²-1,2,4 - triazoline; and N-(1-methyl-guanidino)-5-nitro - 2 - furamidine dihydrochloride is converted to 1-methyl-5-imino-3-(5-nitro-2-furyl)-Δ²-1,2,4-triazoline.

The new compounds of this invention may be readily prepared. The method which is currently preferred consists in bringing together ethyl 5-nitro-2-furimidate hydrochloride and the appropriate hydrazine compound in the presence of a suitable solvent such as the alcohols or dimethylformamide and under the influence of heat followed by isolating the reaction product in conventional fashion as by solvent precipitation; cooling; or a combination thereof with subsequent filtration. A reaction scheme depicting the general format of this reaction is:

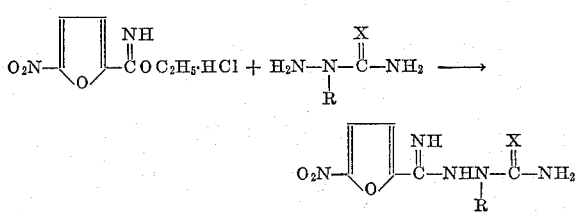

The end product, if secured in the form of a salt, is readily converted to the base by treatment with an alkali such as sodium carbonate. If the salt form is desired for use as an intermediate it may be obtained directly from the reaction mixture or formed from the base by treatment with an acid.

In order that this invention may be readily available to those skilled in the art, the following examples are appended as illustrative, but not limiting.

EXAMPLE I (NF-1019)

*N-guanidino-5-nitro-2-furamidine dihydrochloride*

A. PREPARATION OF ETHYL 5-NITRO-2-FURIMIDATE HYDROCHLORIDE AND AMINOGUANIDINE DIHYDROCHLORIDE MIXTURE

Hydrogen chloride is passed through a stirred mixture of 437 g. (3.21 moles) of aminoguanidine bicarbonate, 443 g. (3.21 moles) of 5-nitro-2-furonitrile and 7340 ml. of ethanol at a rapid rate with the temperature maintained below 30° by means of an ice bath. At the end of 4.5 hours the mixture is poured into 10 l. of ether and refrigerated overnight. The product is isolated by filtration and washed with ether.

Upon air drying to constant weight there is obtained 1064 g. (91.7%). The IR curve of this material identified it as a mixture of ethyl 5-nitro-2-furimidate hydrochloride and aminoguanidine dihydrochloride.

B. PREPARATION OF N-GUANIDINO-5-NITRO-2-FURAMIDINE DIHYDROCHLORIDE

The above solid mixture is added to 4 l. of dimethylformamide and heated to 55–60° by means of a water bath. After 30 minutes at this temperature, the mixture is poured into 10 l. of ether and refrigerated overnight. The product is isolated by filtration and washed by slurrying in 3.5 l. of ethanol. The product is washed on the funnel with ether and dried to constant weight at 60°. There is obtained 736 g. (80%) of title compound.

It may be recrystallized from methanol (30 ml./g.) ether (30 ml./g.) to give the product as pale yellow crystals melting at about 270°.

*Analysis.*—Calcd. for C₆H₈N₆O·2HCl: C, 25.26; H, 3.54; Cl, 24.87; N, 29.48. Found: C, 25.23; H, 3.58; Cl, 25.24; N, 29.49.

EXAMPLE II (NF-1021)

*N-[1-(2-hydroxyethyl)ureido]-5-nitro-2-furamidine*

A mixture of ethyl 5-nitro-2-furimidate hydrochloride (44 g., 0.2 mole), 2-(2-hydroxyethyl) semicarbazide (24 g., 0.2 mole) and ethanol (100 ml.) is heated to 50° and allowed to cool slowly to room temperature. The mixture is diluted with ether to give a gummy solid. After removal of the solvent by decantation, the gum is dissolved in a minimum amount of warm water (about 3 ml./g.). Any solid present is removed by filtration. The filtrate is made basic with solid sodium carbonate and cooled in an ice bath. An orange solid separates and is collected by filtration. The yield of title product is 20 g. (40%).

It may be recrystallized from methanol (30 ml./g.); M.P. 181–182°.

*Analysis.*—Calcd. for C₈H₁₁N₅O₅: C, 37.35; H, 4.31; N, 27.23. Found: C, 37.22; H, 4.13; N, 26.98.

EXAMPLE III (NF-1027)

*N-ureido-5-nitro-2-furamidine*

A mixture of ethyl 5-nitro-2-furimidate hydrochloride (100 g., 0.45 mole), semicarbazide (34 g., 0.45 mole) and ethanol (400 ml.) is heated at 50–60° for 30 mins. with occasional stirring. The mixture is cooled to room temperature and filtered. The orange solid is washed with water, isopropanol, and then with ether. A yield of 49 g. (51%) of title product is obtained after drying by suction. The product melts at about 200°, resolidifies and melts again at 270°.

The product is dissolved in dimethylformamide (10 ml./g.) by heating on a steam bath. The warm solution is diluted with acetonitrile (10 ml./g.) and allowed to cool to room temperature. After several hours at room temperature, the product is collected by filtration. A melting point of 274–275° is obtained.

*Analysis.*—Calcd. for $C_6H_7N_5O_4$: C, 33.81; H, 3.31; N, 32.86. Found: C, 33.98; H, 3.61; N, 32.81.

EXAMPLE IV (NF–1037)

*N-(1-methylguanidino)-5-nitro-2-furamidine dihydrochloride*

A mixture of ethyl 5-nitro-2-furimidate hydrochloride (110 g., 0.5 mole) and 62 g. (0.5 mole) of 1-methyl-1-aminoguanidine hydrochloride in dimethylformamide (350 ml.) is heated at 50–60° for 30 mins. The solution is cooled and diluted with ether to give an oil. The oil is separated from the solution by decantation and washed with acetone until a gum is obtained. When the gum is warmed with isopropanol (300 ml.) for a few minutes, a nearly colorless solid separates. After cooling to room temperature, the mixture is filtered to yield 35 g. (21%) of title product in the form of its dihydrate; M.P. 303–305°.

It may be recrystallized from methanol (10 ml./g.) and ether (10 ml./g.).

*Analysis.*—Calcd. for $C_7H_{10}N_6O_3 \cdot 2HCl \cdot 2H_2O$: C, 25.10; H, 4.81; Cl, 21.16; N, 25.10. Found: C, 25.21; H, 4.63; Cl, 21.28; N, 25.04.

EXAMPLE V (NF–1042)

*N-(1-methylureido)-5-nitro-2-furamidine*

A mixture of ethyl 5-nitro-2-furimidate hydrochloride (110 g., 0.5 mole) and 45 g. (0.5 mole) of 2-methylsemicarbazide in 250 ml. of ethanol is heated at 50–60° for 30 mins. The mixture is cooled in an ice bath for 30 mins., diluted with ether and filtered to give the hydrochloride as a tan, hygroscopic solid.

The hydrochloride is dissolved in water (800 ml.). After filtering, the solution is made basic with a concentrated, aqueous solution of sodium carbonate. The solution is cooled in an ice bath and filtered to yield 73 g. (64%) of an orange solid after washing with isopropanol, ether and drying at 100°. The crude product melts at 180–185°. The product is dissolved in dimethylformamide (10 ml./g.) by heating on a steam bath. After cooling slowly to room temperature, the solution is cooled in an ice bath for a few minutes and filtered. A yield of 54 g. of title product is obtained, M.P. 189–190° after drying at 110°.

It may be recrystallized from methanol (60 ml./g.), M.P. 195–196°.

*Analysis.*—Calcd. for $C_7H_9N_5O_4$: C, 37.01; H, 3.99; N, 30.83. Found: C, 36.89; N, 3.77; N, 30.86.

What is claimed is:

1. A compound selected from the group consisting of a base of the formula:

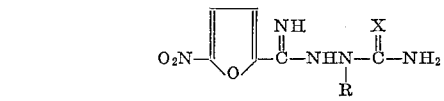

wherein

R represents a member of the group consisting of hydrogen, methyl and 2-hydroxyethyl; and X represents a member of the group consisting of oxygen and imino and the hydrochloride salt thereof.

2. N-guanidino-5-nitro-2-furamidine dihydrochloride.

3. N-[1-(2-hydroxyethyl)-ureido]-5 - nitro - 2 - furamidine.

4. N-ureido-5-nitro-2-furamidine.

5. N-(1-methylguanidino)-5-nitro-2 - furamidine dihydrochloride.

6. N-(1-methylureido)-5-nitro-2-furamidine.

References Cited by the Examiner
UNITED STATES PATENTS 3,084,171    4/1963    Von Esch et al. _____ 260—347.7

NICHOLAS S. RIZZO, *Primary Examiner.*

HENRY R. JILES, *Examiner.*